US012568884B2

(12) United States Patent (10) Patent No.: US 12,568,884 B2

Ma (45) Date of Patent: Mar. 10, 2026

(54) DOUBLE-SWING-ROD MECHANISM AND FRUIT PICKING MACHINE USING SAME

(71) Applicant: DongGuan Koham Industrial Co., Ltd., Dongguan (CN)

(72) Inventor: Xianpeng Ma, Dongguan (CN)

(73) Assignee: DongGuan Koham Industrial Co., Ltd., Dongguan (CN)

( * ) Notice: Subject to any disclaimer, the term of this patent is extended or adjusted under 35 U.S.C. 154(b) by 470 days.

(21) Appl. No.: 18/124,005

(22) Filed: Mar. 21, 2023

(65) Prior Publication Data

US 2023/0225251 A1 Jul. 20, 2023

(30) Foreign Application Priority Data

Mar. 21, 2022 (CN) .......................... 202210281390.9

(51) Int. Cl.
A01D 46/26 (2006.01)

(52) U.S. Cl.
CPC ...... A01D 46/264 (2013.01); A01D 2046/266 (2013.01)

(58) Field of Classification Search
CPC .. A01D 46/26–2046/268; A01D 34/30; A01D 46/00–46/30
See application file for complete search history.

(56) References Cited

U.S. PATENT DOCUMENTS

| | | | |
|---|---|---|---|
| 2017/0238466 A1 | 8/2017 | Tenias Sancho | |
| 2019/0261565 A1 | 8/2019 | Robertson et al. | |
| 2019/0261566 A1 | 8/2019 | Robertson et al. | |

FOREIGN PATENT DOCUMENTS

| | | | | |
|---|---|---|---|---|
| CN | 108040604 A | * | 5/2018 | ............. A01D 46/24 |
| CN | 108353638 A | * | 8/2018 | ........... A01D 46/264 |

OTHER PUBLICATIONS

CN 108040604 A (Year: 2018).*
CN 108353638 A (Year: 2018).*

* cited by examiner

*Primary Examiner* — Joseph M Rocca
*Assistant Examiner* — Madeline I Runco
(74) *Attorney, Agent, or Firm* — Hemisphere Law, PLLC

(57) ABSTRACT

The double-swing-rod mechanism includes a supporting main body used for rigidly supporting a fruit picking machine, a rotating shaft component connected to the supporting main body, two conical gears that axially rotate around the rotating shaft component, two swing rods movably connected to the two conical gears respectively to achieve a swing effect, and a drive gear movably connected to the supporting main body.

11 Claims, 7 Drawing Sheets

DOUBLE-SWING-ROD MECHANISM AND FRUIT PICKING MACHINE USING SAME

TECHNICAL FIELD

The present disclosure relates to the technical field of olive picking machines, in particular, to a double-swing-rod mechanism and a fruit picking machine using same.

BACKGROUND

In order to improve the efficiency of picking olives and other similar products, according to a height problem in picking and a size characteristic of a picked product, a picking tool with a power striking structure, namely, an olive picking machine, is invented, which is used to strike branches of fruit trees to make the branches shake, so as to cause fruits to fall off. The olive picking machine in the prior art mainly includes a striking device using a lever structure, a power main body that drives the striking device to swing, and a supporting rod that carries the power main body and the striking device to a certain height. Specifically, the existing striking device includes a plurality of long and narrow rod-shaped or strip-shaped striking components, and also includes a swing arm that carries the striking components and drives the components to complete a striking action. Generally, there are at least two swing arm components to complete actions with mutual opposite acting forces, which can maintain a balance of force. A main consideration is that a horizontal bar action has poor control over a striking force on fruits. For example, the fruits cannot be struck down or are directly broken, and a high counter-acting force is generated on an operator, resulting in difficulty in operation. The action of the swing arm component is realized by the power main body. The power main body includes a drive motor rigidly supported to the supporting rod and a double-swing-rod mechanism that is in power connection to the drive motor. The drive motor drives the double-swing-rod mechanism to produce an action of a certain trajectory to drive the swing arm component to move, causing the striking components to complete a striking action.

At present, a structural design for the double-swing-rod mechanism at home and abroad mainly uses a crank rocker mechanism to drive the swing arm components to complete a swing action. Since the crank rocker mechanism needs to drive two swing arm components at the same time, a secondary feed structure needs to be hinged between the crank rocker mechanism and each swing arm component to achieve a four-rod hinge manner, for example, equipment for picking olives and similar products described in the domestic patent No. CN201280029788, an operating component of a harvester for picking olives and similar products described in the domestic patent No. CN201821289188, and a device for picking olives and similar products described in the foreign patent No. EP2384614A1. In a structural design, the two secondary feed structures need to be designed to occupy a certain space to ensure that there is no collision. The secondary feed structure will decompose force transmission and reduce a swing amplitude of a swing arm component. In addition, an axial line corresponding to a rocker of a crank rocker mechanism and an axial line corresponding to a motor are arranged in parallel with each other, which can make full use of a length of an olive picking machine, mainly through 45°-engagement of two gears. Although the design of the above structure is conducive to improving the overall length of the olive picking machine, compactness of the structural design will be greatly reduced after the length of the double-swing-rod mechanism is increase. In addition, the 45°-engagement of the two gears will generate a higher counter-reacting force on a housing during running, which will have to rely on more machined parts or reinforcement structures to assist in supporting, and will also lead to an increase in mechanical wear during the running. The prior art also provides a device for picking olives as described in the foreign patent No. EP2862434A1. A crank rocker mechanism and each swing arm component are connected by a universal wheel structure. However, the universal structure is complex and has a high requirement for precision, resulting in an increase in the overall production cost.

SUMMARY

In order to overcome the above deficiencies, the present disclosure aims to provide a technical solution capable of solving the above problems.

A double-swing-rod mechanism includes a supporting main body used for rigidly supporting a fruit picking machine, a rotating shaft component connected to the supporting main body, two conical gears that axially rotate around the rotating shaft component, two swing rods movably connected to the two conical gears respectively to achieve a swing effect, and a drive gear movably connected to the supporting main body, wherein eccentric wheels that rotates around the rotating shaft component are arranged on the conical gears; the swing rods rotate around the eccentric wheels; the two conical gears are oppositely disposed; and the drive gear is engaged between the two conical gears.

Preferably, the supporting main body includes a backplane and supporting plates arranged in front of the backplane; a space for accommodating a gear is formed between the backplane and the two supporting plates; the rotating shaft component is fixedly connected between the two supporting plates; the conical gears are restrained between the two supporting plates through the rotating shaft component; and the drive gear is movably connected to the backplane.

Preferably, a barrier structure corresponding to the drive gear is arranged in a middle portion of the rotating shaft component; and the two conical gears are separated by barrier structure.

Preferably, the conical gears are bevel gears, and the conical gears are engaged with the drive gear by helical tooth structures.

Preferably, the eccentric wheels are formed on the conical gears; rotating shaft holes penetrating through the eccentric wheels are formed in the axial lines of the conical gears; first bearings are arranged in the rotating shaft holes; and the conical gears and the eccentric wheels rotate around the rotating shaft component through the first bearings.

Preferably, connection sleeves surrounding the rotating shaft component are also arranged on the eccentric wheels; peripheries of the connection sleeves are sleeved with flat washers and second bearings; the flat washers are located between the first bearings and the second bearings; and the connection sleeves are movably connected with the supporting plates through the second bearings.

Preferably, third bearings are arranged at peripheries of the eccentric wheels; and one ends of the swing rods are provided with annular portions sleeving the third bearings.

A fruit picking machine using a double-swing-rod mechanism includes the foregoing double-swing-rod mechanism, and further includes a supporting rod, a power drive main body and two striking members, wherein the power drive main body includes a housing and a drive motor; the double-swing-rod mechanism is arranged inside the housing; the drive motor is arranged at a back portion of a supporting main body; the drive motor is in power connection with the drive gear; rotating shaft sleeve holes and power sleeve holes are formed in the two striking members; the two striking members are both rotatably connected to a front end of the housing through the rotating shaft sleeve holes; the two striking members are both hinged and cooperate with the two swing rods through the power sleeve holes; and a rear portion of the housing is fixed on the supporting rod.

Preferably, the housing includes an upper shell and a lower shell that are in longitudinal symmetry; the upper shell and the lower shell fixedly cover each other through a bolt; mounting openings are formed in front ends of the upper shell and the lower shell; two ends of the mounting openings are respectively provided with rotating shaft structures connected to the upper shell and the lower shell; and the rotating shaft structures are rotatably connected with the rotating shaft sleeve holes.

Preferably, the rotating shaft structures include bolt rod pieces, fourth bearings and fifth bearings; the front ends of the upper shell and the lower shell are tightened by using the bolt rod pieces; the fourth bearings and the fifth bearings sleeve the bolt rod pieces; first conical sleeves are also arranged on the bolt rod pieces and located between the fourth bearings and the fifth bearings; second conical sleeves are respectively arranged at positions, located between the fourth bearings and the upper shell, on the bolt rod pieces and positions, located between the fifth bearings and the lower shell, on the bolt rod pieces; the rotating shaft sleeve holes are rotatably connected with the fourth bearings and the fifth bearings; and positioning rings limited between the fourth bearings and the fifth bearings are arranged on inner sides of the rotating shaft sleeve holes.

Preferably, shielding structures located in middle portions of the mounting openings are further respectively formed at the front ends of the upper shell and the lower shell; the two shielding structures are fixedly abutted through bolts; and positions, hinged to the swing rods, of the power sleeve holes are shielded by the shielding structures.

Preferably, fixing bolts connected to the rotating shaft component are respectively arranged on the upper shell and the lower shell; and two ends of the rotating shaft component are respectively in threaded connection with the two fixing bolts.

Preferably, arc surfaces used for wrapping the supporting rod are respectively arranged at rear portions of the upper shell and the lower shell; a clearance capable of being flexibly pressed is reserved between the arc surfaces of the upper shell and the lower shell; and bolt holes for pressing the clearance are respectively formed in the arc surfaces of the upper shell and the lower shell.

Preferably, the striking members include a plurality of long and narrow rod-like or strip-shaped striking components; the striking members further include swing arm components for carrying the striking components and driving the striking components to complete striking actions; the rotating shaft sleeve holes and the power sleeve holes are both arranged on the swing arm components; and the two swing arm components are located on a same plane.

Preferably, the swing arm components include vertical platy structures and ringlike structures surrounding edges of the platy structures; the swing arm components form structures with "I"-shaped cross sections by using the platy structures and the ringlike structures; a plurality of threaded connection cylinders for connecting the plurality of striking components are formed on the swing arm components; openings of the threaded connection cylinders are upward; the threaded connection cylinders are longitudinally combined with the platy structures; the threaded connection cylinders are transversely combined with the ringlike structures; the threaded connection cylinders are in threaded connection with connectors; the connectors are combined to the striking components by means of injection molding; and the rotating shaft sleeve holes and the power sleeve holes are both formed in the swing arm components.

Compared with the prior art, the present disclosure has the following beneficial effects.

In terms of gear fitting, a top and a bottom of the drive gear are respectively engaged with the conical gears, so that an engagement area of the drive gear is greatly enlarged. Compared with the traditional structure in which the drive gear is only engaged with one conical gear, the present disclosure can improve engagement between the gears, so that mechanical wear during running is reduced, and running between the gears is more stable.

In terms of force balance, an opposite acting force generated by the engagement between the gears on the housing is reduced by using clockwise and anticlockwise rotations of the two conical gears. With reference to the structural design of the eccentric wheel, the two swing rods can move reversely during running, and can achieve an effect of maintaining a force balance like a traditional secondary feed structure.

In terms of force transmission, gear transmission is used to replace the traditional secondary feed structure, which changes a force transmission manner, implements that the two swing rods are simultaneously driven in a three-rod hinge manner, reduces decomposition of a force caused by parts in a fitting process, and increases a swing amplitude of the striking members.

In terms of space design, the engagement between the drive gear and the conical gears makes full use of a three-dimensional space design, so that the compactness of the overall structure is improved by simplifying an overall length by using a thickness, and all the parts cooperate each other more compactly.

The additional aspects and advantages of the prevent disclosure will be provided in the following descriptions, part of which will become apparent from the following descriptions or be learned through the practice of the prevent disclosure.

BRIEF DESCRIPTION OF THE DRAWINGS

To describe the embodiments of the present disclosure or the technical solutions in the existing art more clearly, drawings required to be used in the embodiments or the illustration of the existing art will be briefly introduced below. Obviously, the drawings in the illustration below are only some embodiments of the present disclosure. Those ordinarily skilled in the art also can acquire other drawings according to the provided drawings without doing creative work.

Figure 1:
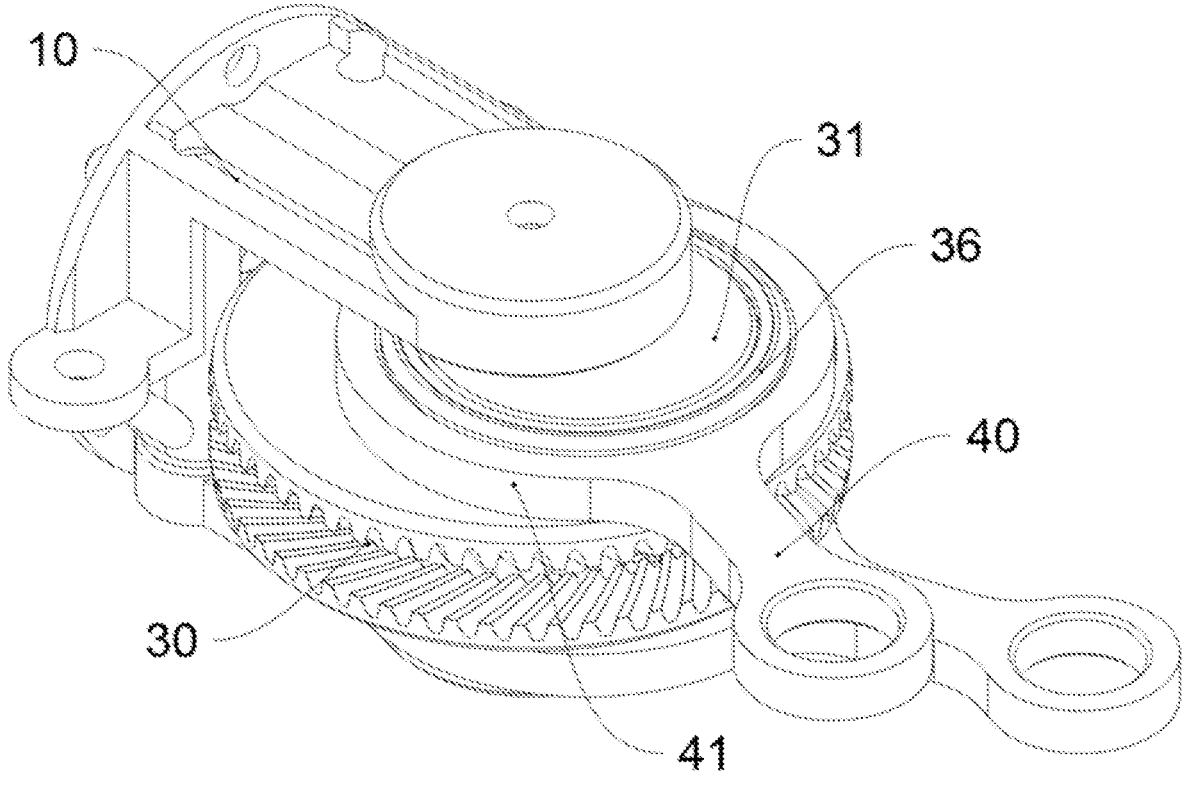
FIG. 1 is a schematic structural diagram of a double-swing-rod mechanism in the present disclosure.

Reference numerals and names in the drawings are as follows:

supporting body 10, rotating shaft component 20, conical gear 30, swing rod 40, drive gear 50, supporting rod 60, striking member 70, power drive main body 80, rotating shaft structure 90, backplane 11, supporting plate 12, barrier structure 21, fixing bolt 22, eccentric wheel 31, first bearing 32, connection sleeve 33, flat washer 34, second bearing 35, third bearing 36, annular portion 41, rotating shaft sleeve hole 71, power sleeve hole 72, striking component 73, swing arm component 74, platy structure 75, ringlike structure 76, threaded connection cylinder 77, connector 78, positioning ring 79, housing 81, drive motor 82, upper shell 83, lower shell 84, arc surface 85, bolt hole 86, mounting opening 87, shielding structure 88, bolt rod piece 91, fourth bearing 92, fifth bearing 93, first conical sleeve 94, and second conical sleeve 95.

DETAILED DESCRIPTION OF THE EMBODIMENTS

The technical solutions in the embodiments of the present disclosure will be clearly and completely described below. Apparently, the described embodiments are only a part of the embodiments of the present disclosure, rather than all the embodiments. All other embodiments obtained by those of ordinary skill in the art based on the embodiments in the present disclosure without creative work shall fall within the protection scope of the present disclosure.

Referring to FIG. 1 to FIG. 7, in this embodiment of the present disclosure, a double-swing-rod mechanism includes a supporting main body 10 used for rigidly supporting a fruit picking machine, a rotating shaft component 20 connected to the supporting main body 10, two conical gears 30 that axially rotate around the rotating shaft component 20, two swing rods 40 movably connected to the two conical gears 30 respectively to achieve a swing effect, and a drive gear 50 movably connected to the supporting main body 10. Eccentric wheels 31 that rotates around the rotating shaft component 20 are arranged on the conical gears 30. The swing rods 40 rotate around the eccentric wheels 31. The two conical gears are oppositely disposed. The drive gear 50 is engaged between the two conical gears 30. A fruit picking machine using the foregoing double-swing-rod mechanism is provided, which further includes a supporting rod 60, a power drive main body 80 and two striking members 70. The power drive main body 80 includes a housing 81 and a drive motor 82. The double-swing-rod mechanism is arranged inside the housing 81. The drive motor 82 is arranged at a back portion of a supporting main body 10. The drive motor 82 is in power connection with the drive gear 50. Rotating shaft sleeve holes 71 and power sleeve holes 72 are formed in the two striking members 70. The two striking members 70 are both rotatably connected to a front end of the housing 81 through the rotating shaft sleeve holes 71. The two striking members 70 are both hinged and cooperate with the two swing rods 40 through the power sleeve holes 72. A rear portion of the housing 81 is fixed on the supporting rod 60.

In the above technical solution, a manner of coaxially clockwise and anticlockwise rotations of the gears is ingeniously used. The eccentric wheels 31 drive the two swing rods 40 to swing, so that the double-swing-rod mechanism is arranged inside the housing 81 of the power drive main body 80. The drive gear 50 is in power connection with the drive motor 82. The striking members 70 of the fruit picking machine is arranged on the housing 81 of the drive main body 80. The double-swing-rod mechanism and the striking members 70 are then hinged to complete overall power connection. By means of this technical means, in terms of gear fitting, a top and a bottom of the drive gear 50 are respectively engaged with the conical gears 30, so that an engagement area of the drive gear 50 is greatly enlarged. Compared with the traditional structure in which the drive gear 50 is only engaged with one conical gear 30, the present disclosure can improve engagement between the gears, so that mechanical wear during running is reduced, and running between the gears is more stable.

In terms of force balance, an opposite acting force generated by the engagement between the gears on the housing 81 is reduced by using clockwise and anticlockwise rotations of the two conical gears 30. With reference to the structural design of the eccentric wheels 31, the two swing rods 40 can move reversely during running, and can achieve an effect of maintaining a force balance like a traditional secondary feed structure.

In terms of force transmission, gear transmission is used to replace the traditional secondary feed structure, which changes a force transmission manner, implements that the two swing rods 40 are simultaneously driven in a three-rod hinge manner, reduces decomposition of a force caused by parts in a fitting process, and increases a swing amplitude of the striking members 70.

In terms of space design, the engagement between the drive gear 50 and the conical gears 30 makes full use of a three-dimensional space design, so that the compactness of the overall structure is improved by simplifying an overall length by using a thickness, and all the parts cooperate each other more compactly.

Figure 2:
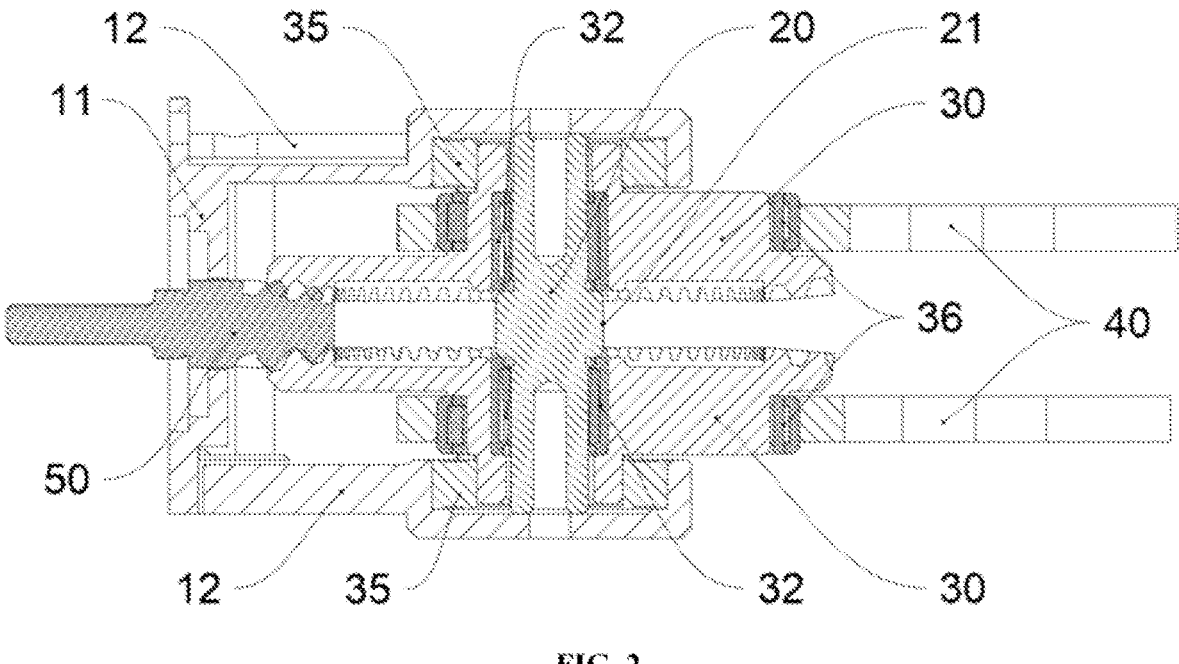
FIG. 2 is a schematic sectional structural diagram of a double-swing-rod mechanism in the present disclosure.
Figure 3:
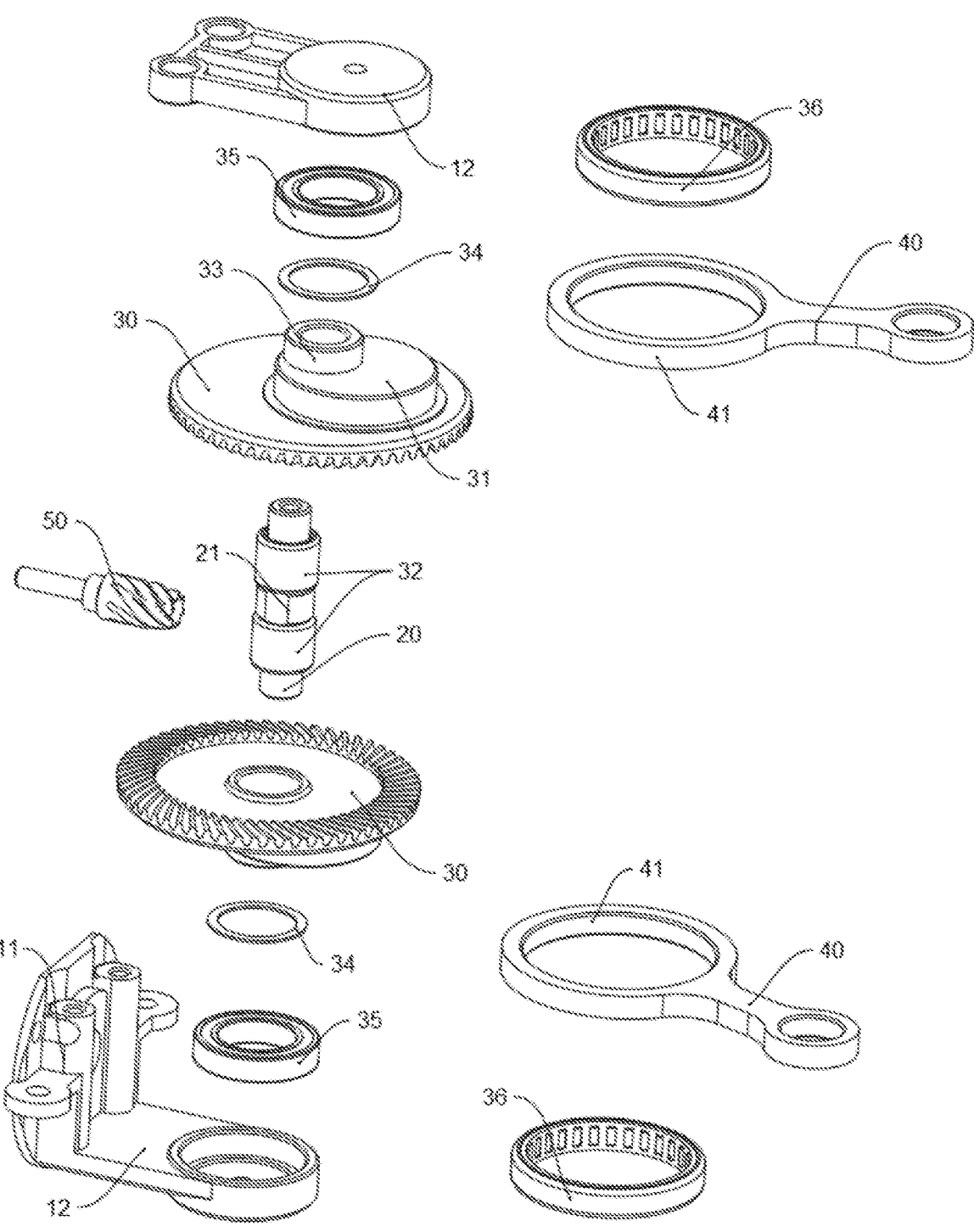
FIG. 3 is an exploded structural diagram of a double-swing-rod mechanism in the present disclosure.
Figure 4:
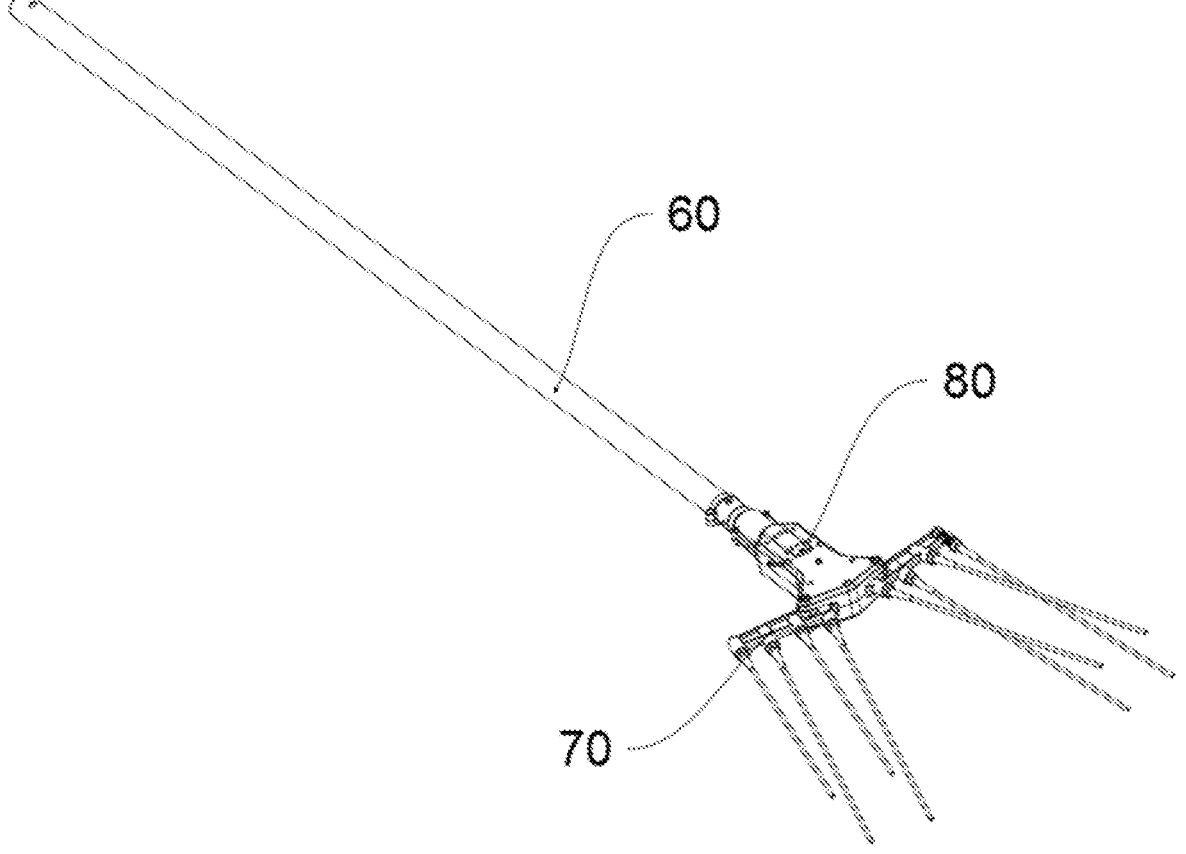
FIG. 4 is a schematic structural diagram of a fruit picking machine in the present disclosure.
Figure 5:
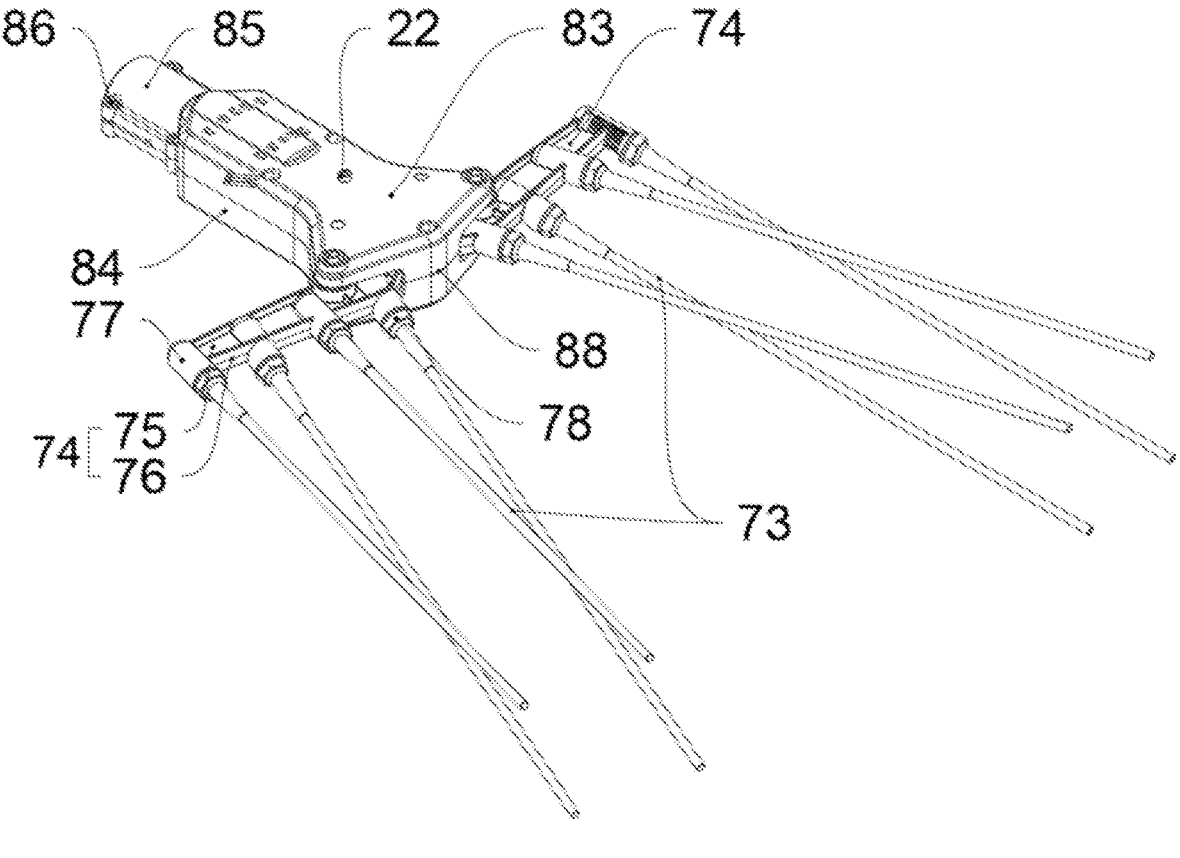
FIG. 5 is a schematic structural diagram of a fruit picking machine without a supporting rod in the present disclosure.
Figure 6:
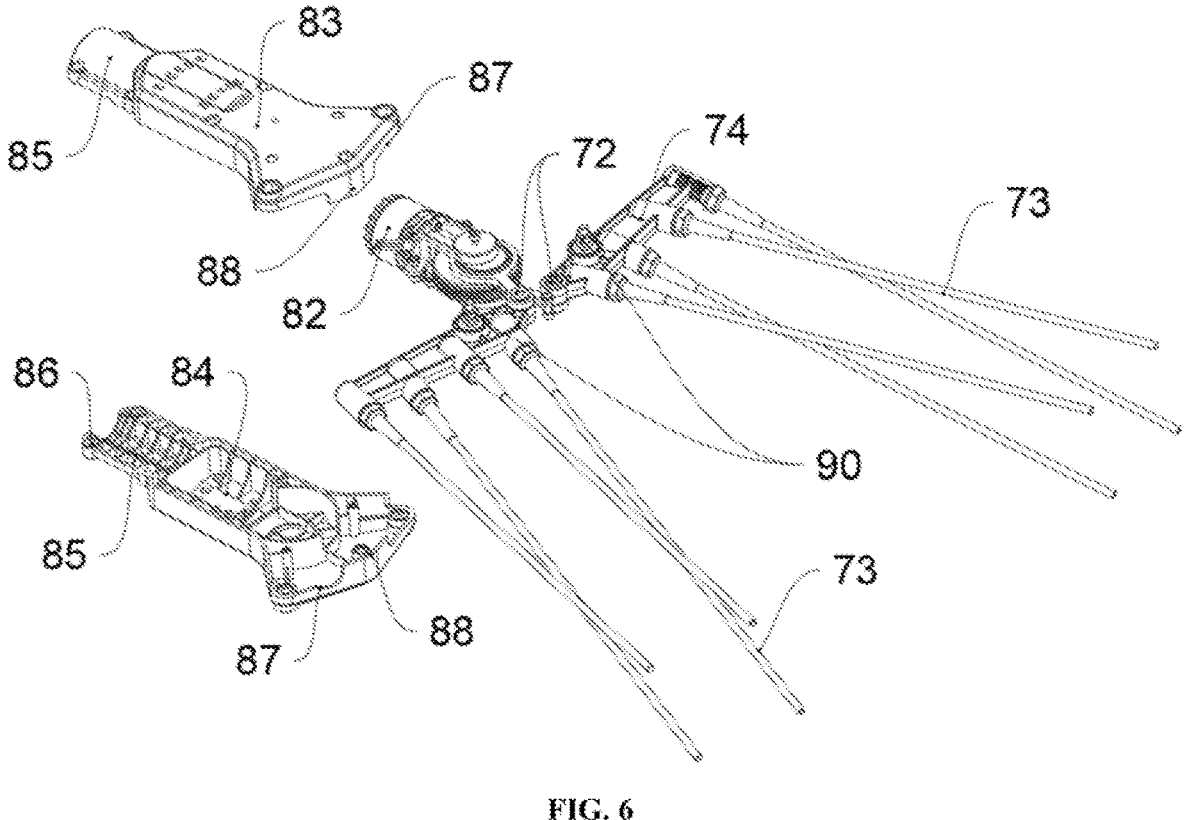
FIG. 6 is a schematic structural diagram after a housing in FIG. 5 is disassembled in the present disclosure.
Figure 7:
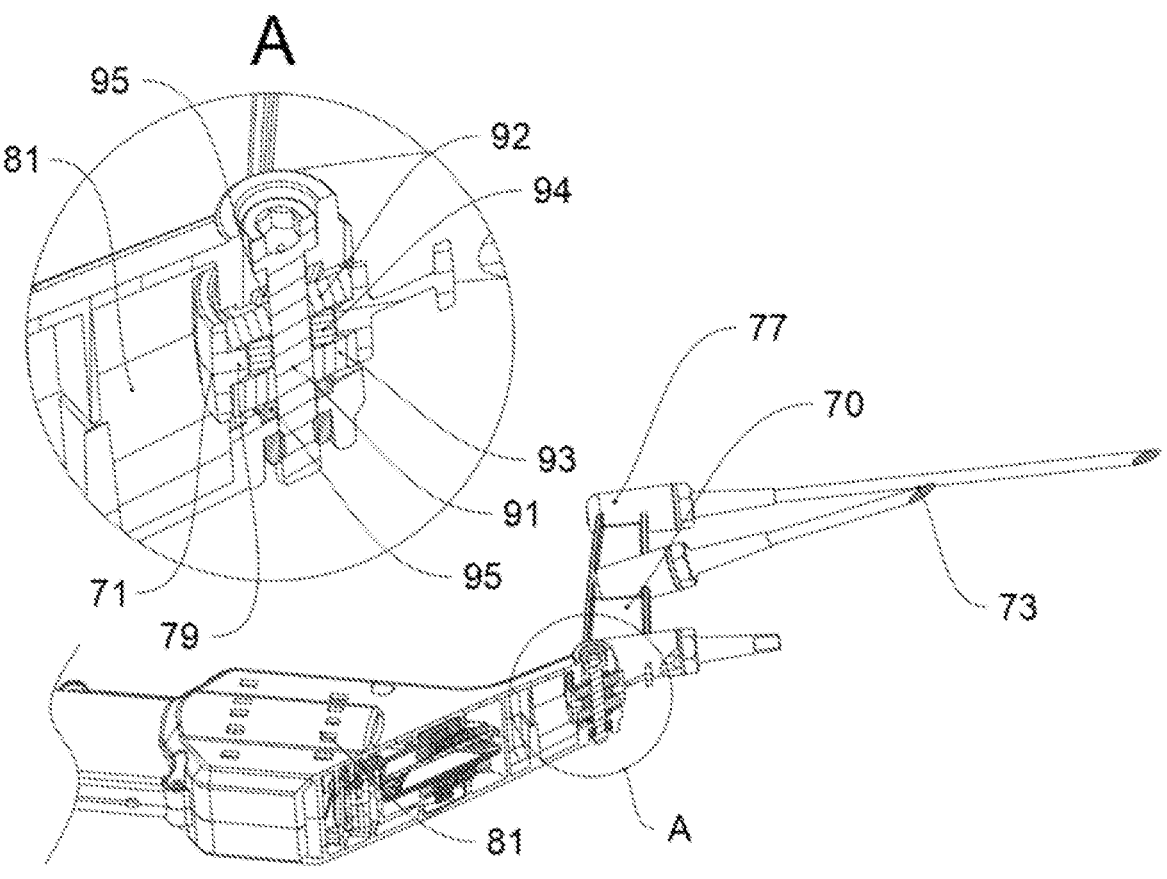
FIG. 7 is an enlarged diagram of a circle A in the present disclosure after sectioning along a rotating shaft structure.

In order to more clearly and completely describe the technical means taken by the above technical solutions to solve the technical problems, the following will implement specific technical features on the double-swing-rod mechanism and the fruit picking machine:

The technical features for the double-swing-rod mechanism are as follows:

Further as shown in FIG. 1 to FIG. 3, the supporting main body 10 is designed to include a backplane 11 and supporting plates 12 arranged in front of the backplane 11. A space for accommodating a gear is formed between the backplane 11 and the two supporting plates 12. The rotating shaft component 20 is fixedly connected between the two supporting plates 12. The conical gears 30 are restrained between the two supporting plates 12 through the rotating shaft component 20. The drive gear 50 is movably connected to the backplane 11. A rear portion of the supporting main body 10 is provided with the drive motor 82, and a front portion of the supporting main body 10 is connected with the striking members 70. For cooperation between the two conical gears 30 and the drive gear 50 as well as the rotating shaft component 20, preferably, a barrier structure 21 corresponding to the drive gear 50 is arranged in a middle portion of the rotating shaft component 20. The two conical gears 30 are separated by the barrier structure 21. In addition, the conical gears 30 are bevel gears, and the conical gears 30 are engaged with the drive gear 50 by helical tooth structures. The eccentric wheels 31 and the conical gears 30 are of an integrated structure. That is, the eccentric wheels 31 are formed on the conical gears 30. Rotating shaft holes penetrating through the eccentric wheels 31 are formed in the axial lines of the conical gears 30. First bearings 32 are arranged in the rotating shaft holes. The conical gears 30 and the eccentric wheels 31 rotate around the rotating shaft component 20 through the first bearings 32, thereby achieving reliable connection between the eccentric wheels 31, the conical gears 30 and the rotating shaft component 20. In this structural design, connection sleeves 33 surrounding the rotating shaft component 20 are also arranged on the eccentric wheels 31. Peripheries of the connection sleeves 33 are sleeved with flat washers 34 and second bearings 35. The flat washers 34 are located between the first bearings 32 and the second bearings 35. The connection sleeves 33 are movably connected with the supporting plates 12 through the second bearings 35, so that cooperation between the conical gears 30 and the supporting main body 10 is more reliable. For cooperation between the eccentric wheels 31 and the swing rods 40, third bearings 36 are arranged at peripheries of the eccentric wheels 31. One ends of the swing rods 40 are provided with annular portions 41 sleeving the third bearings 36.

The technical features for the fruit picking machine are as follows:

Further as shown in FIG. 4 to FIG. 7, the striking members 70 mainly structurally include a plurality of long and narrow rod-like or strip-shaped striking components 73, and swing arm components 74 for carrying the striking components 73 and driving the striking components to complete striking actions. The rotating shaft sleeve holes 71 and the power sleeve holes 72 are both arranged on the swing arm components 74. During use, the supporting rod is held with a hand to drive the power drive main body 80, and the swing arm components 74 will swing, thereby driving the striking components 73 to strike fruits or branches, so that the fruits shake and fall off. For the structural design, to improve strength of the striking members 70 and facilitate removal and replacement of the striking components 73 on the striking members 70, the swing arm components 74 include vertical platy structures 75 and ringlike structures 76 surrounding edges of the platy structures 75. The swing arm components 74 form structures with "I"-shaped cross sections by using the platy structures 75 and the ringlike structures 76. A plurality of threaded connection cylinders 77 for connecting the plurality of striking components 73 are formed on the swing arm components 74. Openings of the threaded connection cylinders 77 are upward. The threaded connection cylinders 77 are longitudinally combined with the platy structures 75. The threaded connection cylinders 77 are transversely combined with the ringlike structures 76. The threaded connection cylinders 77 are in threaded connection with connectors 78. The connectors 78 are combined to the striking components 73 by means of injection molding. The rotating shaft sleeve holes 71 and the power sleeve holes 72 are both formed in the swing arm components 74. Since the swing arm components 74 are configured to be of the structures with the "I"-shaped cross sections, and the threaded connection cylinders 77 are formed on the structures, which fully uses a triangular supporting structure, so that this structural design is hard to bend or break, and materials for producing the swing arm components 74 can be saved. The striking components 73 and the swing arm components 74 are then connected by using the connectors 78, so that the striking components 73 are in threaded connection with the swing arm components 74 through the connectors 78, and it is convenient to remove and replace the striking components 73. In addition, the two swing arm components 74 are located on a same plane. The two swing arm components 74 are designed to be on the same plane to maintain a force balance in the plane and a space when the two swing arm components 74 swing each other. A certain rotational force will be generated in the swing process if the two swing arm components 74 are not located on the same plane.

For a structural design of the housing 81, the housing 81 includes an upper shell 83 and a lower shell 84 that are in longitudinal symmetry. The upper shell 83 and the lower shell 84 fixedly cover each other through a bolt. Mounting openings 87 are formed in front ends of the upper shell 83 and the lower shell 84. The mounting openings 87 are used for being connected to the two striking members 70. Two ends of the mounting openings 87 are respectively provided with rotating shaft structures 90 connected to the upper shell 83 and the lower shell 84. The rotating shaft structures 90 are rotatably connected with the rotating shaft sleeve holes 71. Specifically, the rotating shaft structures 90 include bolt rod pieces 91, fourth bearings 92 and fifth bearings 93. The front ends of the upper shell 83 and the lower shell 84 are tightened by using the bolt rod pieces 91. The fourth bearings 92 and the fifth bearings 93 sleeve the bolt rod pieces 91. First conical sleeves 94 are also arranged on the bolt rod pieces 91 and located between the fourth bearings 92 and the fifth bearings 93. Second conical sleeves 95 are respectively arranged at positions, located between the fourth bearings 92 and the upper shell 83, on the bolt rod pieces 91 and positions, located between the fifth bearings 93 and the lower shell 84, on the bolt rod pieces. The rotating shaft sleeve holes 71 are rotatably connected with the fourth bearings 92 and the fifth bearings 93. Positioning rings 79 limited between the fourth bearings 92 and the fifth bearings 93 are arranged on inner sides of the rotating shaft sleeve holes 71. By this design, the running fit between the housing 81 and the swing arm components is stable and reliable. In addition, shielding structures 88 located in middle portions of the mounting openings 87 are further respectively formed at the front ends of the upper shell 83 and the lower shell 84. The two shielding structures 88 are fixedly abutted through bolts. Positions, hinged to the swing rods, of the power sleeve holes are shielded by the shielding structures 88.

To improve fitting firmness between the rotating shaft component 20 and the housing 81, fixing bolts 22 connected to the rotating shaft component 20 are respectively arranged on the upper shell 83 and the lower shell 84. Two ends of the rotating shaft component 20 are respectively in threaded connection with the two fixing bolts 22. For a connection manner of the housing 81 and the supporting rod 60, arc surfaces 85 used for wrapping the supporting rod 60 are respectively arranged at rear portions of the upper shell 83 and the lower shell 84. A clearance capable of being flexibly pressed is reserved between the arc surfaces 85 of the upper shell 83 and the lower shell 84. Bolt holes 86 for pressing the clearance are respectively formed in the arc surfaces 85 of the upper shell 83 and the lower shell 84. Therefore, the housing 81 and the supporting rod 60 can be detachably connected. For those skilled in the art, it is apparent that the present disclosure is not limited to the details of the demonstrative embodiments mentioned above, and that the present disclosure can be realized in other specific forms without departing from the spirit or basic features of the present disclosure. Therefore, from any point of view, the embodiments should be regarded as exemplary and non-limiting. The scope of the present disclosure is defined by the appended claims rather than the above description. Therefore, all changes falling within the meanings and scope of equivalent elements of the claims are intended to be included in the present disclosure.

What is claimed is:

1. A double-swing-rod mechanism, comprising a supporting main body used for rigidly supporting a fruit picking machine, a rotating shaft component connected to the supporting main body, two conical gears that axially rotate around the rotating shaft component, two swing rods movably connected to the two conical gears respectively to achieve a swing effect, and a drive gear movably connected to the supporting main body, wherein eccentric wheels that rotate around the rotating shaft component are arranged on the conical gears; the swing rods rotate around the eccentric wheels; the two conical gears are oppositely disposed; and the drive gear is engaged between the two conical gears;

wherein the supporting main body comprises a backplane and supporting plates arranged in front of the backplane; a space for accommodating a gear is formed between the backplane and the two supporting plates; the rotating shaft component is fixedly connected between the two supporting plates; the conical gears are restrained between the two supporting plates through the rotating shaft component; and the drive gear is movably connected to the backplane;

wherein a barrier structure corresponding to the drive gear is arranged in a middle portion of the rotating shaft component; and the two conical gears are separated by the barrier structure;

wherein the eccentric wheels are formed on the conical gears; rotating shaft holes penetrating through the eccentric wheels are formed in axial lines of the conical gears; first bearings are arranged in the rotating shaft holes; and the conical gears and the eccentric wheels rotate around the rotating shaft component through the first bearings.

2. The double-swing-rod mechanism according to claim 1, wherein the conical gears are bevel gears, and the conical gears are engaged with the drive gear by helical tooth structures.

3. The double-swing-rod mechanism according to claim 1, wherein connection sleeves surrounding the rotating shaft component are also arranged on the eccentric wheels; peripheries of the connection sleeves are sleeved with flat washers and second bearings; the flat washers are located between the first bearings and the second bearings; and the connection sleeves are movably connected with the supporting plates through the second bearings.

4. The double-swing-rod mechanism according to claim 1, wherein third bearings are arranged at peripheries of the eccentric wheels; and ends of the swing rods are provided with annular portions sleeving the third bearings.

5. A fruit picking machine using a double-swing-rod mechanism, comprising the double-swing-rod mechanism according to claim 1, further comprising a supporting rod, a power drive main body and two striking members, wherein the power drive main body comprises a housing and a drive motor; the double-swing-rod mechanism is arranged inside the housing; the drive motor is arranged at a back portion of a supporting main body; the drive motor is in power connection with the drive gear; rotating shaft sleeve holes and power sleeve holes are formed in the two striking members; the two striking members are both rotatably connected to a front end of the housing through the rotating shaft sleeve holes; the two striking members are both hinged and cooperate with the two swing rods through the power sleeve holes; and a rear portion of the housing is fixed on the supporting rod.

6. The fruit picking machine using the double-swing-rod mechanism according to claim 5, wherein the housing comprises an upper shell and a lower shell that are in longitudinal symmetry; the upper shell and the lower shell fixedly cover each other through a bolt; mounting openings are formed in front ends of the upper shell and the lower shell; two ends of the mounting openings are respectively provided with rotating shaft structures connected to the upper shell and the lower shell; and the rotating shaft structures are rotatably connected with the rotating shaft sleeve holes.

7. The fruit picking machine using the double-swing-rod mechanism according to claim 6, wherein the rotating shaft structures comprise bolt rod pieces, fourth bearings and fifth bearings; the front ends of the upper shell and the lower shell are tightened by using the bolt rod pieces; the fourth bearings and the fifth bearings sleeve the bolt rod pieces; first conical sleeves are also arranged on the bolt rod pieces and located between the fourth bearings and the fifth bearings; second conical sleeves are respectively arranged at positions, located between the fourth bearings and the upper shell, on the bolt rod pieces and positions, located between the fifth bearings and the lower shell, on the bolt rod pieces; the rotating shaft sleeve holes are rotatably connected with the fourth bearings and the fifth bearings; and positioning rings limited between the fourth bearings and the fifth bearings are arranged on inner sides of the rotating shaft sleeve holes.

8. The fruit picking machine using the double-swing-rod mechanism according to claim 6, wherein shielding structures located in middle portions of the mounting openings are further respectively formed at the front ends of the upper shell and the lower shell; the two shielding structures are fixedly abutted through bolts; and positions, hinged to the swing rods, of the power sleeve holes are shielded by the shielding structures.

9. The fruit picking machine using the double-swing-rod mechanism according to claim 6, wherein fixing bolts connected to the rotating shaft component are respectively arranged on the upper shell and the lower shell; and two ends of the rotating shaft component are respectively in threaded connection with the two fixing bolts.

10. The fruit picking machine using the double-swing-rod mechanism according to claim 6, wherein arc surfaces used for wrapping the supporting rod are respectively arranged at rear portions of the upper shell and the lower shell; a clearance capable of being flexibly pressed is reserved between the arc surfaces of the upper shell and the lower shell; and bolt holes for pressing the clearance are respectively formed in the arc surfaces of the upper shell and the lower shell.

11. The fruit picking machine using the double-swing-rod mechanism according to claim 6, wherein the striking members comprise a plurality of long and narrow rod-like or strip-shaped striking components; the striking members further comprise swing arm components for carrying the striking components and driving the striking components to complete striking actions; the rotating shaft sleeve holes and the power sleeve holes are both arranged on the swing arm components; and the two swing arm components are located on a same plane.

* * * * *